(12) United States Patent
Olson

(10) Patent No.: US 7,950,736 B2
(45) Date of Patent: May 31, 2011

(54) ADJUSTABLE SEAT ASSEMBLY

(75) Inventor: Jesse W. Olson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 46 days.

(21) Appl. No.: 11/680,481

(22) Filed: Feb. 28, 2007

(65) Prior Publication Data

US 2008/0203795 A1    Aug. 28, 2008

(51) Int. Cl.
*B62M 1/00* (2010.01)
*B62M 27/02* (2006.01)
*B62J 1/00* (2006.01)

(52) U.S. Cl. ............. 297/215.14; 297/195.11; 180/190; 280/220

(58) Field of Classification Search ............. 297/195.12, 297/195.1, 215.14, 183.9, 215.13, 195.11; 180/190, 219, 208; 280/220
See application file for complete search history.

(56) References Cited

U.S. PATENT DOCUMENTS

| | | | |
|---|---|---|---|
| 2,141,093 A | 12/1938 | Richter et al. | |
| 2,396,511 A | 3/1946 | Issigonis | |
| 2,628,657 A | 2/1953 | Orrick, Jr. | |
| 2,868,273 A | 1/1959 | Barrett | |
| 2,984,290 A | 5/1961 | Miller | |
| 4,059,171 A | 11/1977 | Pakosh | |
| 4,129,198 A | 12/1978 | Hunter | |
| 4,544,199 A | 10/1985 | Wrigley | |
| 4,563,038 A | 1/1986 | Hirose | |
| 4,779,695 A | 10/1988 | Yasui | |
| 5,007,675 A | 4/1991 | Musto et al. | |
| 5,149,034 A | 9/1992 | Ganaja | |
| 5,207,289 A | 5/1993 | Wilmo | |
| 5,458,213 A | 10/1995 | Nakaya et al. | |
| 5,474,317 A | 12/1995 | Piszkin | |
| 5,713,629 A | 2/1998 | Plackis | |
| 6,267,071 B1 | 7/2001 | Ellis | |
| 6,460,818 B1 | 10/2002 | Garelick et al. | |
| 6,547,027 B1 * | 4/2003 | Kalhok et al. | 180/312 |
| 6,578,652 B1 | 6/2003 | Kobacker, II et al. | |
| 6,582,004 B1 | 6/2003 | Hamm | |
| 6,702,058 B2 * | 3/2004 | Ishii et al. | 180/311 |
| 6,732,830 B2 | 5/2004 | Gagnon et al. | |
| 7,306,069 B2 * | 12/2007 | Takeshima et al. | 180/312 |
| 7,367,573 B2 * | 5/2008 | Kudo et al. | 280/124.109 |
| 2003/0080594 A1 * | 5/2003 | Geyer et al. | 297/215.13 |

(Continued)

FOREIGN PATENT DOCUMENTS

FR    1330683    9/1973

(Continued)

*Primary Examiner* — Sarah B McPartlin
(74) *Attorney, Agent, or Firm* — Black Lowe & Graham PLLC (57) ABSTRACT

A vehicle seat is slidably mounts to rails secured to a vehicle chassis. The rails extend downwardly and away from the steering shaft of the vehicle at a substantial slope. Grooves formed in the rails receive posts secured to the seat to slidably mount the seat. A plurality of registration surfaces, such as a row of apertures, are secured to the rails and engage one or more locking pins. The locking pins are actuated by cables extending to a lever positioned near the edge of the seat. Springs urge the locking pins into engagement with the registration surfaces when tension is not applied to the cables. In an alternative embodiment, an air spring mounts between the seat and vehicle chassis. The amount of air within the air spring controls the position of the seat along the rails.

1 Claim, 10 Drawing Sheets

U.S. PATENT DOCUMENTS

| | | |
|---|---|---|
| 2003/0094558 A1 | 5/2003 | Yamada et al. |
| 2004/0011939 A1 | 1/2004 | Hohnl et al. |
| 2004/0245744 A1 | 12/2004 | Emang et al. |
| 2005/0115754 A1 | 6/2005 | Watson et al. |
| 2005/0206204 A1* | 9/2005 | Ogawa et al. ............ 297/215.14 |
| 2007/0034435 A1* | 2/2007 | Berg et al. .................... 180/190 |

FOREIGN PATENT DOCUMENTS

| | | |
|---|---|---|
| WO | 9425331 | 11/1994 |
| WO | 9518738 | 7/1995 |

\* cited by examiner

ADJUSTABLE SEAT ASSEMBLY

FIELD OF THE INVENTION

This invention relates generally to adjustable seats and, more specifically, to adjustable seats for straddle mount vehicles.

BACKGROUND OF THE INVENTION

Snowmobiles are manufactured in only a limited range of sizes and configurations, in contrast with the sizes of riders who enjoy riding snowmobiles. Furthermore, individual riders will often use a snowmobile differently at different times. However, typical snowmobiles are designed for a designated purpose. Typical snowmobiles are dedicated to specific purposes such as racing, mountain riding, trail riding, long distance touring, hill climbing, and the like.

Such snowmobiles do not accommodate a variety of user sizes and riding styles. For trail touring, a rider typically sits substantially upright with arms extended. For aggressive riding and hill climbing, the rider may lean and/or shift forward with the arms bent sharply. Typically, a rider must own multiple snowmobiles in order to accommodate these different riding styles.

It would therefore be an advancement in the art to provide a system allowing a user to readily adapt a snowmobile for different riding styles and users of different sizes.

SUMMARY OF THE INVENTION

A vehicle includes a seat slidably mounted to a vehicle chassis. The seat selectively slides along rails either up and toward the handlebars of the vehicle or down and away from the handlebars. The seat mounts to rails extending downwardly and away from the steering shaft of the vehicle at a substantial slope. Grooves formed in the rails receive posts secured to the seat to slidably mount the seat. A plurality of registration surfaces, such as a row of apertures, are secured to the rails and engage one or more locking pins. The locking pins are actuated by cables extending to a lever positioned near the edge of the seat. Springs urge the locking pins into engagement with the registration surfaces when tension is not applied to the cables. In an alternative embodiment, an air spring mounts between the seat and vehicle chassis. The user varies the amount of air within the air spring to adjust the position of the seat along the rails.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1A:
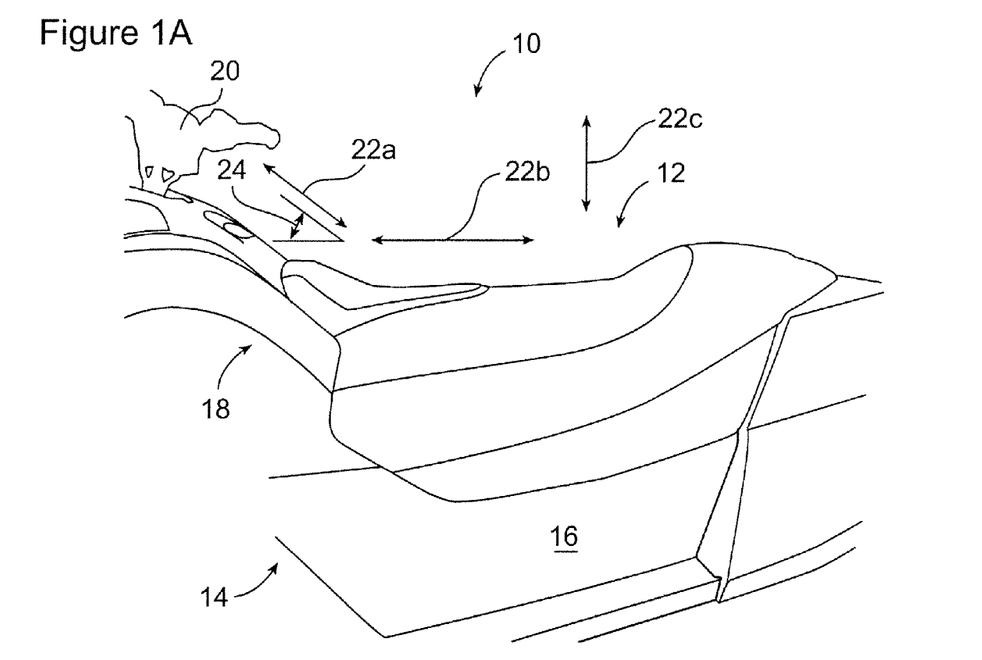
FIGS. 1A and 1B are side views of an adjustable seat, in accordance with an embodiment of the present invention.
Figure 1B:
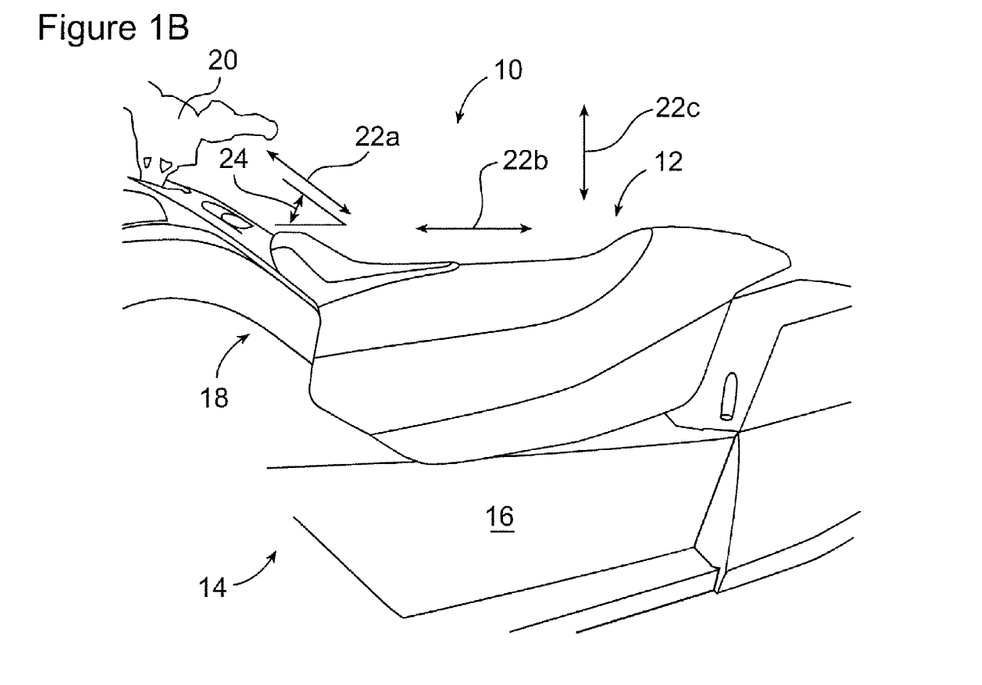

Referring to FIGS. 1A and 1B, a snowmobile 10 has a seat 12 mounted to the chassis 14 and extending over a tunnel 16. The forward end of the tunnel 16 secures to the chassis near an engine compartment 18. Handlebars 20 are likewise mounted near the forward end of the tunnel 16. The handlebars 20 are mounted in a position to be gripped by a user seated on the seat 12.

The seat 12 slidably mounts to the chassis to be slidable along an adjustment direction 22a extending at a substantial angle above a horizontal direction 22b corresponding to the direction of travel of the snowmobile 10. The angled adjustment path of the seat 12 enables simultaneous adjustment along the vertical direction 22c and the horizontal direction 22b. A driver wishing to travel large distances comfortably may adjust the seat down and away to the position of FIG. 1A in order to grasp the handlebars seated upright with the legs bent at a comfortable angle. On the other hand, a driver wishing to drive aggressively may shift the seat up and toward the engine compartment to the position of FIG. 1B to grasp the handlebars in a forwardly inclined posture and to shift the center of gravity of the combined snowmobile and driver toward the dimensional center of the snowmobile in order to improve handling. The raised seat 12 will also ease the transition to standing.

The angle 24 of the adjustment direction 22a relative to horizontal is typically sufficiently large to accomplish a substantial vertical adjustment relative to a horizontal movement. In some embodiments, the angle 24 is between 12 and 60 degrees. In other embodiments, the angle 24 is between 40 and 4 degrees. In the preferred embodiment the angle is about 45 degrees.

Figure 2:
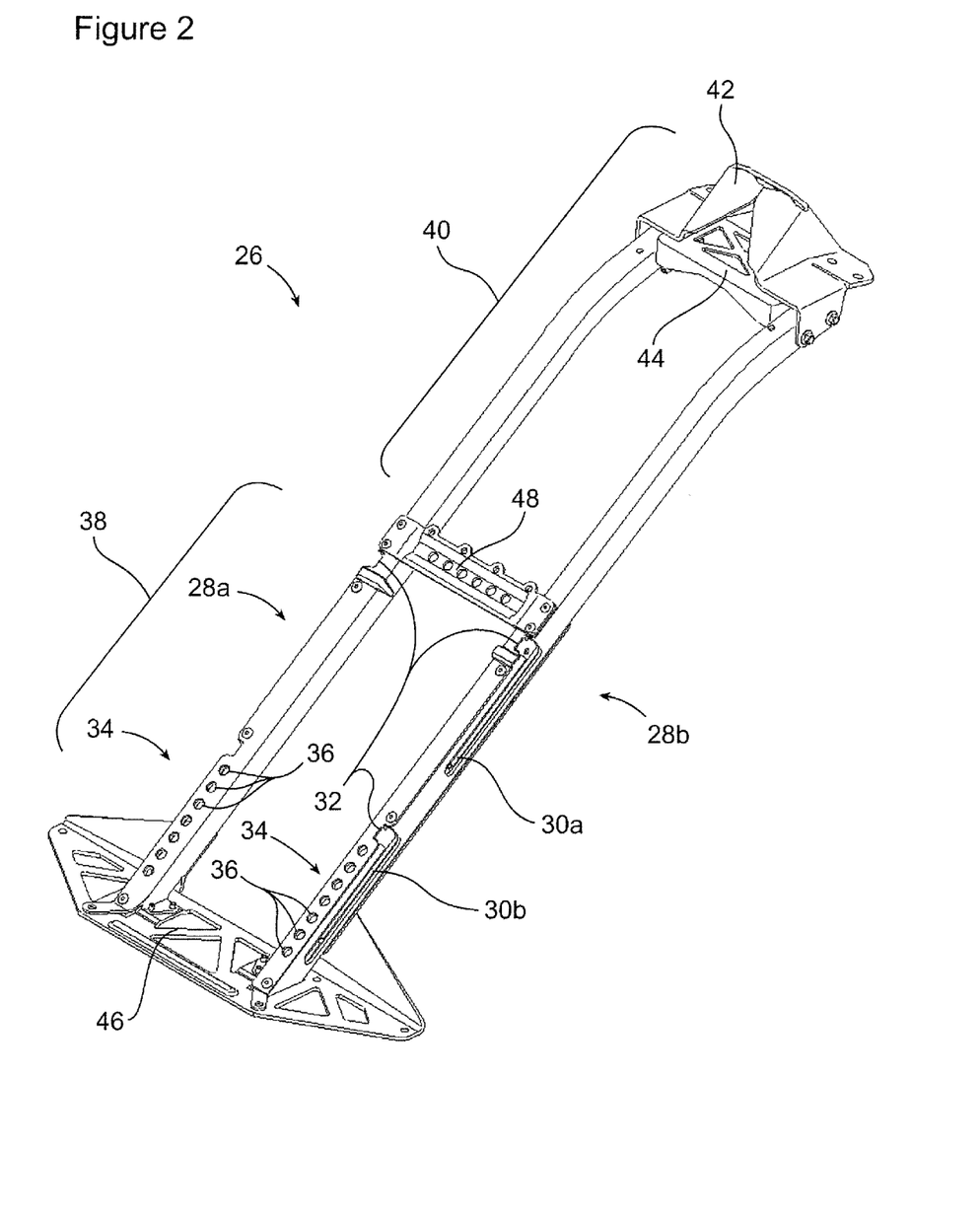
FIG. 2 is an isometric view of rails suitable for mounting an adjustable seat, in accordance with an embodiment of the present invention.

Referring to FIGS. 1 and 2, the seat 12 mounts to the snowmobile 10 by means of a mounting frame 26 extending from the tunnel 16 toward the handlebars 20. The mounting frame 26 includes one or more rails 28a, 28b. The rails 28a, 28b each include one or more grooves 30a, 30b. In the illustrated embodiment, two grooves 30a, 30b are formed in each of the rails 28a, 28b, separated from one another. Recesses 32 formed in the rails 28a, 28b permit insertion of posts or like structures into the grooves 30a, 30b. A plurality of registration surfaces 34 secure to the rails 28a, 28b or to another structure secured to the snowmobile 10. The registration surfaces 34 provide multiple points of securement along the rails 28a, 28b. In the illustrated embodiment, the registration surfaces 34 are a plurality of apertures 36 evenly distributed along a portion of the rails 28a, 28b.

The rails 28a, 28b may include a lower portion 38 and an upper portion 40. The lower portion 38 is exposed for mounting the seat 12. The upper portion 40 extends beneath a body panel of the snowmobile to near the steering column (not shown) and secures to the chassis 14 by means of a bracket 42 and cross piece 44. The lower portion 38 is exposed when not covered by the seat 12 and bears the grooves 30a, 30b and registration surfaces 34. The lower portion 38 secures to a gusset 46 fastened to the tunnel 16. A second cross piece 48 secures to the rails 28a, 28b near the boundary between the upper and lower portions 38, 40. The cross piece 48 typically receives fasteners securing the cross piece 48 to the chassis 14. The cross piece 48 is preferably located at a lower edge of a body panel covering the upper portion 40.

Figure 3:
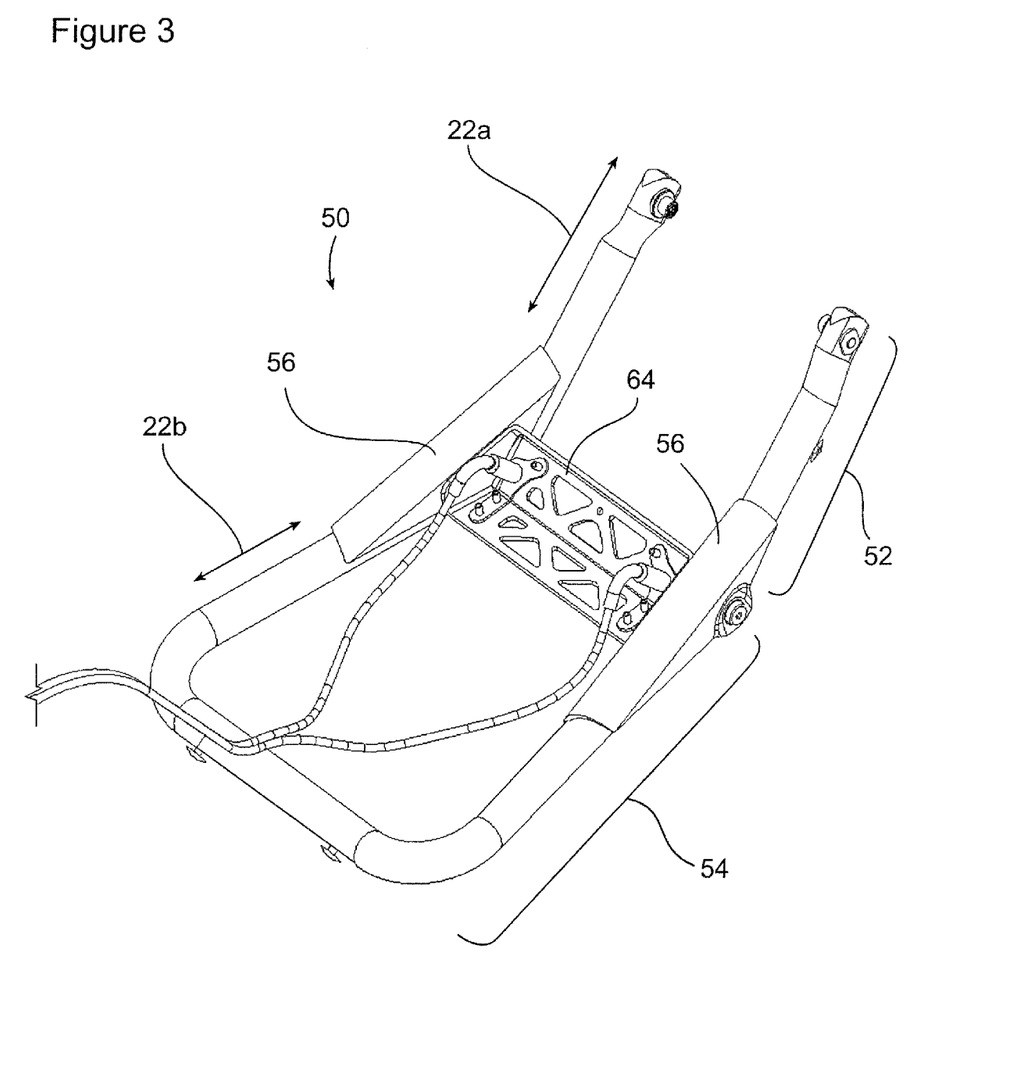
FIG. 3 is an isometric view of a seat frame for an adjustable seat, in accordance with an embodiment of the present invention.

Referring to FIGS. 2 and 3, the seat 12 includes a seat frame 50. The seat frame 50 includes a first portion 52 and a second portion 54. The first portion 52 and second portion 54 support the seat 12 in a substantially horizontal orientation. When mounted, the seat frame 50 is supported by the rails 28a, 28b in a cantilevered fashion, extending rearwardly from the rails 28a, 28b such that the rails 28a, 28b provide substantially all support for the seat 12. The second portion 54 is angled with respect to the first portion 52. The angle formed by the first and second portions 50, 52 may correspond to the angle 24 of the rails 28a, 28b. In the illustrated embodiment, the first portion 52 is angled upward slightly from the horizontal direction 22b with the second portion 54 oriented parallel to the adjustment direction 22a. The seat frame 50 is typically formed of metal tubes bent into a shape having a length and width suitable for supporting the seat 12. Gussets 56 are secured proximate the transition between the first and second portions 52 and 54 in order to reinforce the frame 50 and provide a support platform for the seat 12.

Figure 4:
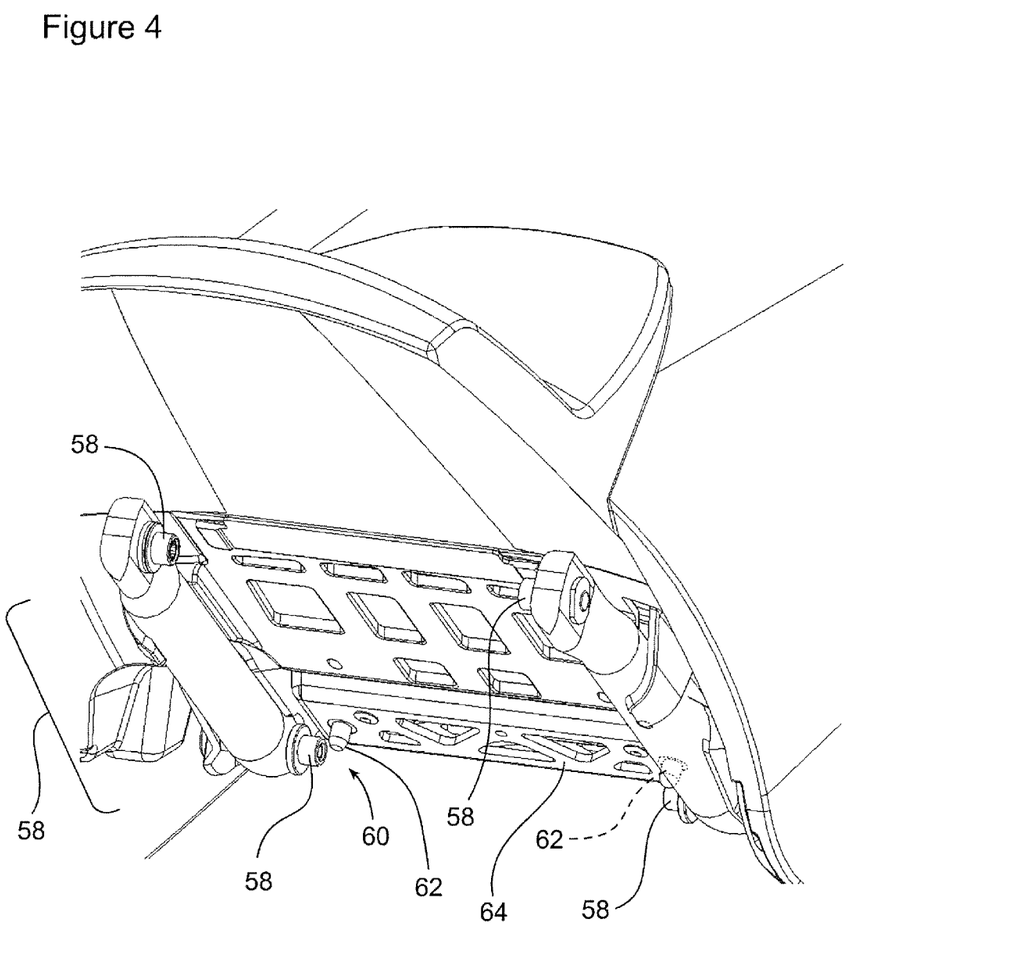
FIG. 4 is a bottom isometric view of a seat frame for an adjustable seat, in accordance with an embodiment of the present invention.
Figure 5:
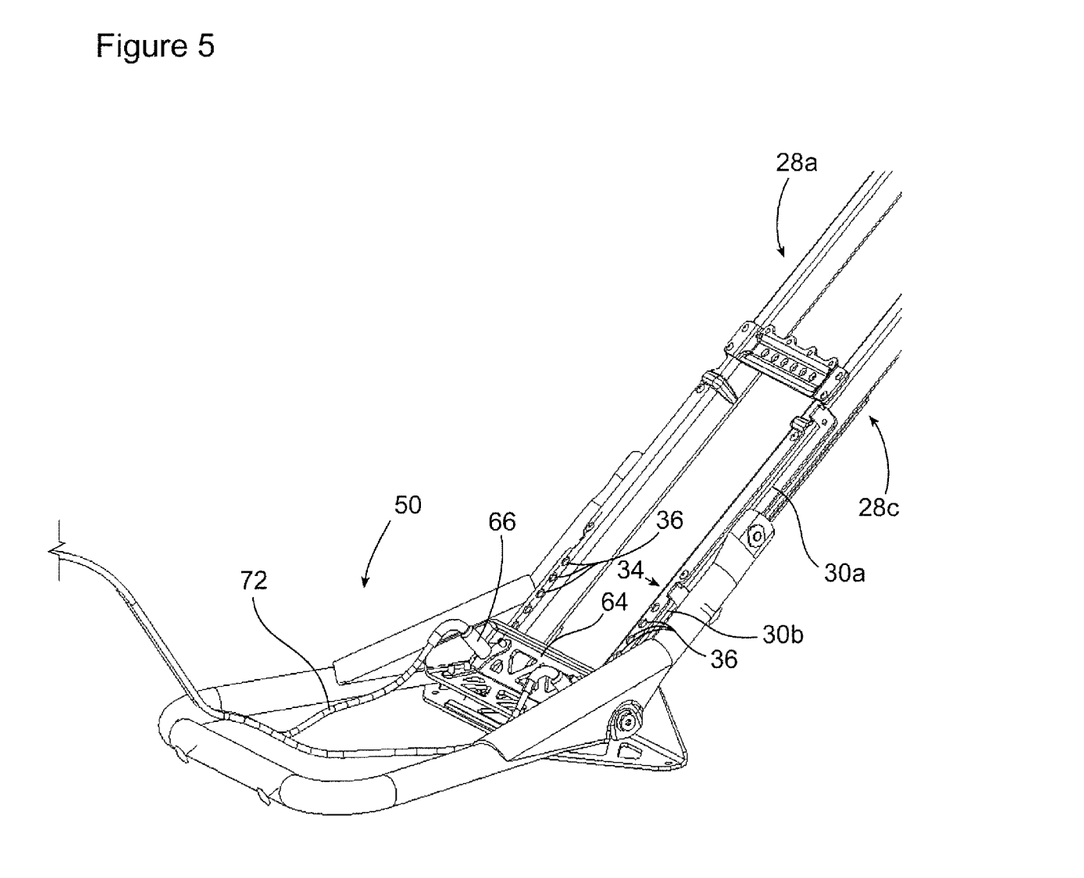
FIG. 5 is an isometric view of a seat frame secured to rails, in accordance with an embodiment of the present invention.

Referring to FIGS. 4 and 5, posts 58 secured on either side of the ends of the first portion 52 are received within the grooves 30a, 30b. In the illustrated embodiment the posts 58 face inwardly in order to engage outwardly facing grooves 30a, 30b. In an alternative embodiment, the grooves face inwardly whereas the posts 58 extend outwardly. The posts 58 may bear a low friction material in order to facilitate sliding within the grooves 30a, 30b. Various alternative mounting systems are possible to achieve the cantilevered support and angled adjustment path for a snowmobile seat. For example, rails 28a, 28b may be mounted to the seat 12 whereas posts 58 mount to a structure fixedly secured to the snowmobile chassis 14.

A locking mechanism 60 engages the registration surfaces 34 to fix the position of the seat 12 relative to the rest of the snowmobile 10. In the illustrated embodiment, the locking mechanism 60 includes actuated pins 62 mounted to a cross member 64 such that the pins 62 are insertable into the apertures 36 when the posts 58 are positioned within the grooves 30a, 30b.

Figure 6:
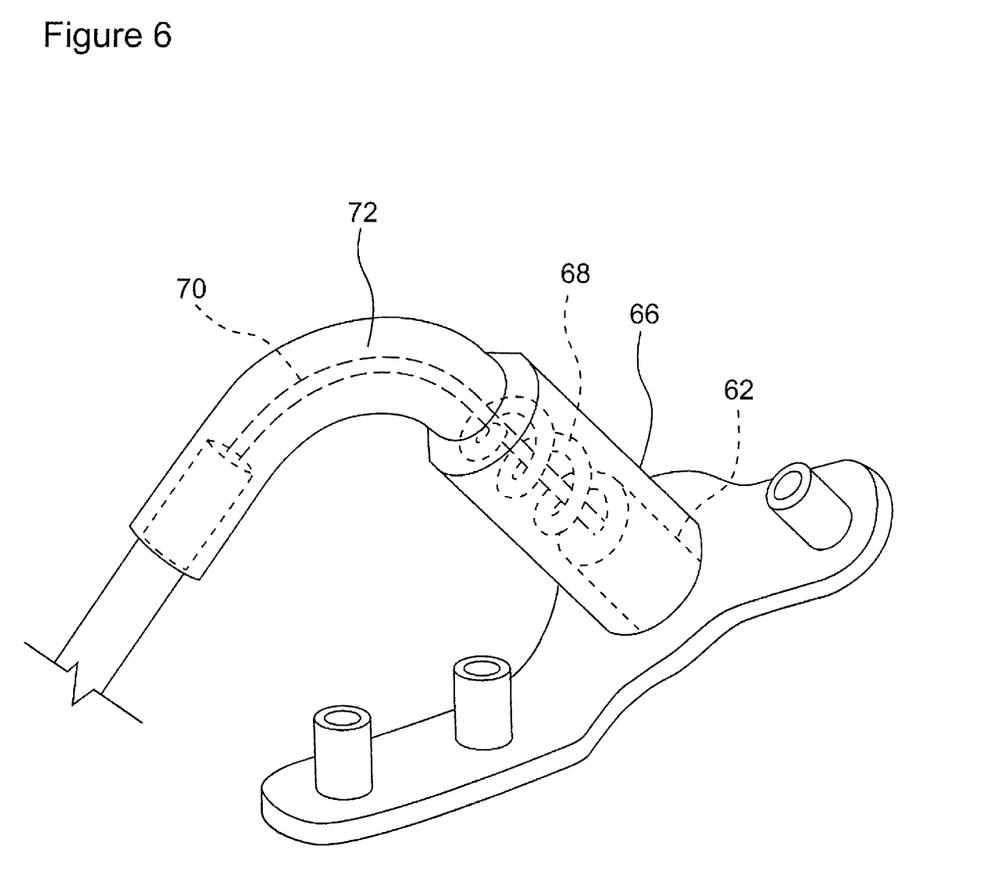
FIG. 6 is an isometric view of a locking pin, in accordance with an embodiment of the present invention.
Figure 7:
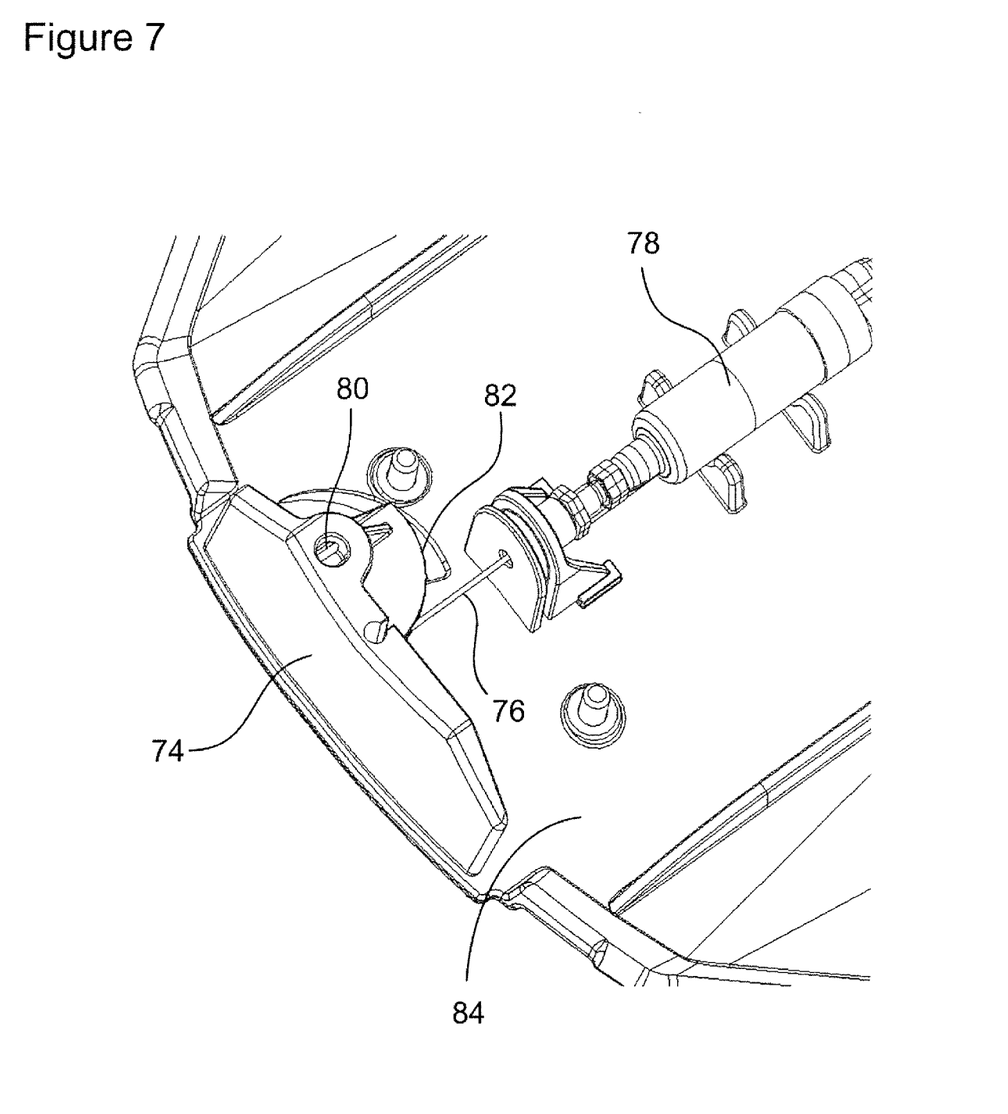
FIG. 7 is an isometric view of a release lever, in accordance with an embodiment of the present invention.

Referring to FIGS. 5 and 6, the pins 62 mount within seats 66 having springs 68 biasing the pins 62 outwardly toward engagement with the apertures 36. Cables 70 connect to the pins and extend through sheaths 72 to a location accessible by an operator of the snowmobile 10. Referring to FIG. 7, in the illustrated embodiment, the cables 70 are actuated by the same or a distinct lever 74. In the illustrated embodiments, the cables 70 actuating the two pins 62 are actuated by a common lever 74. In the illustrated embodiment, the cables 70 secure to a single cable 76 within a housing 78. The cable 76 is then mounted to the lever 74 offset from a point of pivotal securement 80. The lever 74 includes a guide channel 82 for improving the transmission of motion to the cable 76.

Figure 8:
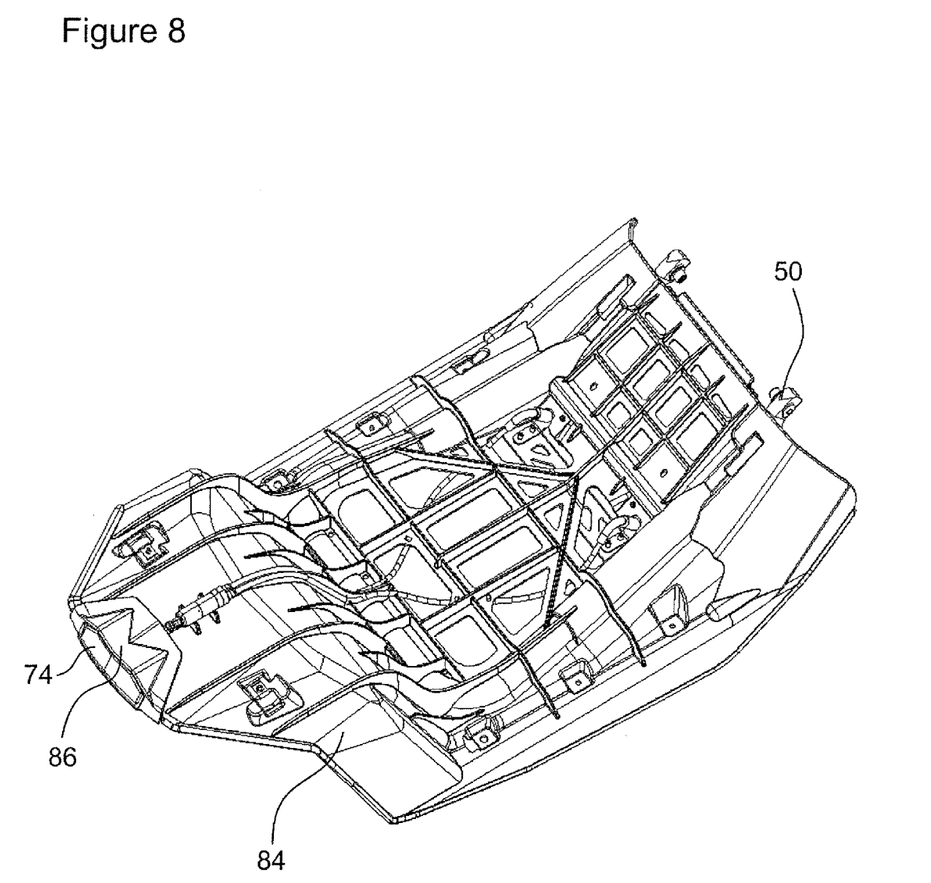
FIG. 8 is an isometric view of a shell for an adjustable seat, in accordance with an embodiment of the present invention.

Referring to FIG. 8, in the illustrated embodiment, the lever 74 mounts to a shell 84 forming part of the seat 12. In the preferred embodiment, the lever 74 mounts to the shell 84 such that the portion of the lever 74 facing outwardly from the shell 84 is substantially flush with the edge of the shell 84. A cover 86 mounts to the shell 84 over the housing 78 and cable 76. The shell 84 secures to the seat frame 50 to provide a substantially horizontal support surface for a seat cushion.

Figure 9:
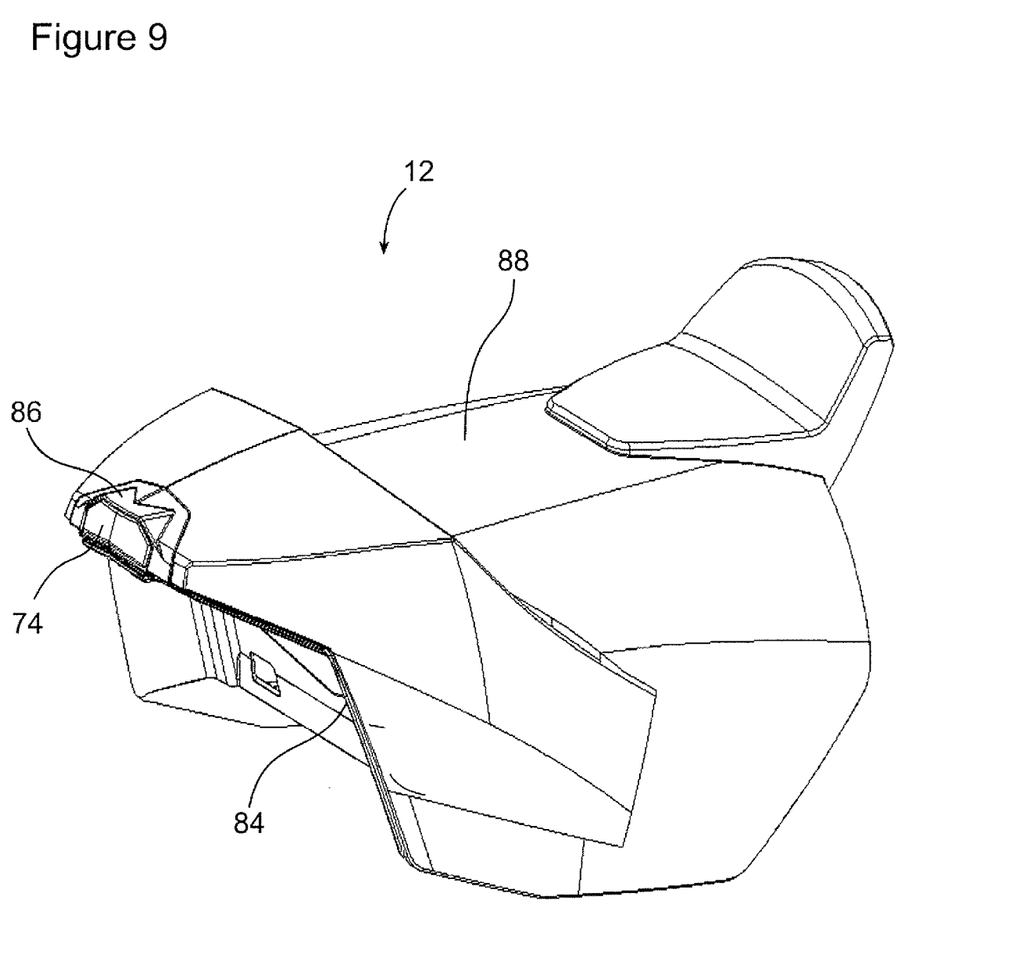
FIG. 9 is an isometric view of an assembled adjustable seat, in accordance with an embodiment of the present invention.

Referring to FIG. 9, a cushion 88 mounts to the shell 84 such that the lever 74 is exposed. In operation, a user will pull outwardly on the lever 74 in order to disengage the pins 62 from the apertures 36 in order to allow the seat 12, to slide. The seat 12 may then be adjusted to a different position, as shown in FIGS. 1A and 1B, and the lever released to allow the spring 64 to bias the pins 62 into a different aperture 34.

Figure 10:
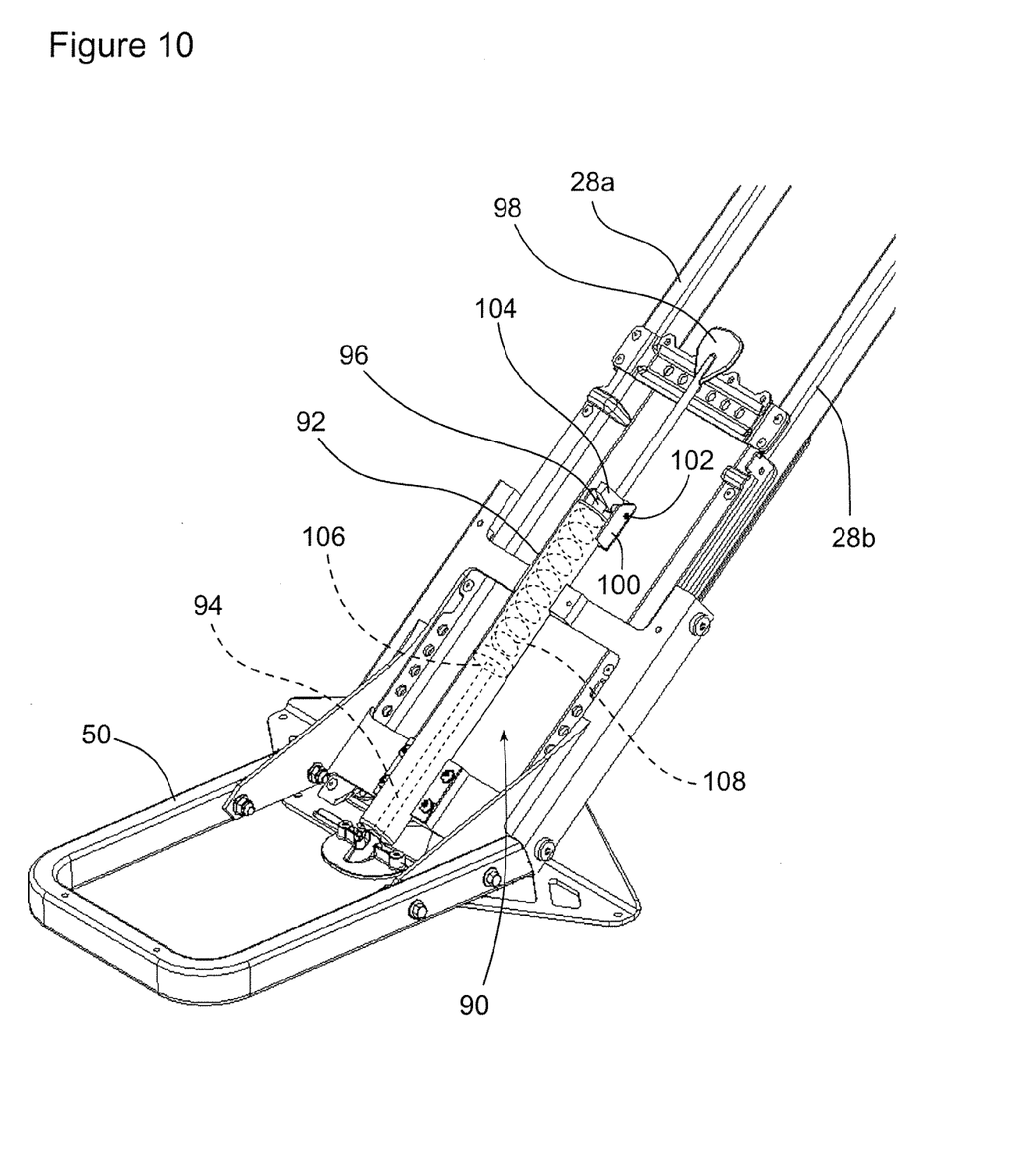
FIG. 10 is an isometric view of a seat frame and rails having an air spring adjustment mechanism, in accordance with an embodiment of the present invention.

Referring to FIG. 10, in an alternative embodiment, adjustment for the seat 12 is provided by an air spring 90. The air spring 90 preferably includes a cylinder 92 and piston rod 94. In the illustrated embodiment, the cylinder 92 secures to the seat frame 50 and the piston rod 94 secures to the chassis 14, however, this arrangement may be readily reversed.

A valve 96 controls the release of air from the cylinder 92. In operation, height adjustment is achieved by controlling the amount of air in the cylinder 92. A handle 98 pivotally mounted to the cylinder 92 is accessible when the shell 84 is mounted to the seat frame 50. The handle 98 may mount to the cylinder 92 by means of a bracket 100 and a pivot pin 102 extending through the handle 98 and bracket 100. The handle 98 may bear an arm 104 pivotable against the valve 96 to release air from the cylinder 92.

Within the cylinder 92 is a piston 106 mounted to the piston rod 94 for compressing the air within the piston 106. In some embodiments, a spring 108 is interposed between the piston 106 and the cylinder 92. The spring 108 may serve to increase the force required to depress the piston 106. The spring 108 may also force the piston 106 outwardly from the cylinder 92 to draw air into the cylinder 92 when the valve 96 is opened, unless a counteracting force is applied to the piston 106.

Other mounting arrangements of the cylinder 92 and piston are possible. Whereas, in the illustrated embodiment, the cylinder 92 and piston rod 94 are substantially parallel to the rails 28a, 28b, in other embodiments, the cylinder 92 and piston rod 94 are oriented substantially perpendicular to the rails 28a, 28b, such that either the cylinder 92 or piston rod 94 secures to a rearward end of the seat frame 50 or shell 84.

While the preferred embodiments of the invention have been illustrated and described, as noted above, many changes can be made without departing from the spirit and scope of the invention. Accordingly, the scope of the invention is not limited by the the preferred embodiment. Instead, the invention should be determined entirely to the claims that follow.

The embodiment of the invention in which an exclusive property or privilege is claimed are defined as follows:

1. A vehicle seat mounting system adapted for use on a snowmobile having a steering system controlled by a grippable portion, the vehicle seat mounting system comprising:

a seat positioned to support a rider, the seat having fore and aft end portions with a saddle therebetween and extending substantially horizontal;

at least two rails laterally spaced apart from each other and each coupled to both a chassis and a tunnel of the snowmobile, each rail extending along a generally linearly sloped adjustment path directed from the steering system toward the tunnel, the seat positioned over both front and aft portions of the rails while being supported and slidably engageable with only the aft portion of the rails, the linearly sloped adjustment path configured to permit a substantial vertical adjustment relative to a simultaneous horizontal adjustment of the seat, wherein the seat is supported proximate to and above the tunnel and slopes downward toward the tunnel; and detent mechanisms respectively arranged on the seat and on the aft portions of the rails for selectively moving a position of the seat relative to the rails along the linearly sloped adjustment path.

* * * * *